US012759685B2

(12) United States Patent
Caponnetto

(10) Patent No.: US 12,759,685 B2
(45) Date of Patent: Oct. 13, 2026

(54) DUAL FLUID INTERACTING PROPULSION SYSTEM FOR A VESSEL

(71) Applicant: CAPONNETTO HUEBER S.L., Valencia (ES)

(72) Inventor: Mario Caponnetto, Valencia (ES)

(73) Assignee: CAPONNETTO HUEBER S.L., Valencia (ES)

( * ) Notice: Subject to any disclaimer, the term of this patent is extended or adjusted under 35 U.S.C. 154(b) by 281 days.

(21) Appl. No.: 18/834,940

(22) PCT Filed: Feb. 1, 2023

(86) PCT No.: PCT/US2023/012159
§ 371 (c)(1),
(2) Date: Jul. 31, 2024

(87) PCT Pub. No.: WO2023/150195
PCT Pub. Date: Aug. 10, 2023

(65) Prior Publication Data

US 2025/0171125 A1 May 29, 2025

(30) Foreign Application Priority Data

Feb. 1, 2022 (EP) .................................... 22382084

(51) Int. Cl.
*B63H 13/00* (2006.01)
*B63H 7/02* (2006.01)
*B63H 19/04* (2006.01)

(52) U.S. Cl.
CPC ............... *B63H 13/00* (2013.01); *B63H 7/02* (2013.01); *B63H 19/04* (2013.01); *B60L 2200/32* (2013.01); *B63B 2209/14* (2013.01); *B63B 2209/20* (2013.01)

(58) Field of Classification Search
CPC . B63H 7/00; B63H 7/02; B63H 13/00; B63H 19/02; B63H 19/04; B63B 2209/14; B63B 2209/20; B60L 8/006; B60L 2200/32
See application file for complete search history.

(56) References Cited

U.S. PATENT DOCUMENTS

| | | | | |
|---|---|---|---|---|
| 4,371,346 | A * | 2/1983 | Vidal | F03D 9/32 290/55 |
| 5,863,228 | A | 1/1999 | Tether | |
| 6,261,138 | B1 * | 7/2001 | Imura | B63H 23/24 114/144 RE |
| 10,577,067 | B1 * | 3/2020 | Ouchi | B60L 50/10 |
| 2009/0189396 | A1 * | 7/2009 | Terao | B63J 3/02 290/55 |
| 2017/0022976 | A1 | 1/2017 | Ouchi | |

FOREIGN PATENT DOCUMENTS

| | | | | |
|---|---|---|---|---|
| CH | 714175 A2 | 3/2019 | | |
| EP | 3121109 A1 | 1/2017 | | |
| KR | 101358852 B1 * | 2/2014 | | B63J 3/02 |
| KR | 1020210120172 A | 10/2021 | | |

* cited by examiner

*Primary Examiner* — Andrew Polay

(57) ABSTRACT

The invention pertains to a vessel comprising a propulsion system comprising both an aerodynamic spinning actuator and a hydrodynamic spinning actuator both being used concurrently to move the vessel in sustainable low emission operating conditions. The invention also pertains to a method for operating such a system.

4 Claims, 5 Drawing Sheets

DUAL FLUID INTERACTING PROPULSION SYSTEM FOR A VESSEL

RELATED APPLICATIONS

This application is a § 371 application of PCT/US2023/012159 filed Feb. 1, 2023, which claims priority from European Patent Application No. 22 382084 filed Feb. 1, 2022, each of which is incorporated herein by reference in its entirety.

TECHNICAL FIELD

The invention pertains to the field of vessel propulsion, More particularly, the invention relates to the use of renewable energy for the propulsion of a vessel.

BACKGROUND ART

The use of wind energy for moving vessels is known for centuries if not millennials.

Starting from the late nineteenth century sailing ships have ben replaced by fossil fuel propelled ships the latter being capable of conveying higher load, faster and more predictably at the expense of green house gas emissions.

Maritime shipping is currently considered to be responsible of 3% to 4% global GHG emissions and rising, not mentioning other associated pollution issues.

It is therefore an objective of decarbonizing sea transport notably by going back to the use of renewable wind energy.

However, in a globalized economy such a shipping of goods has to be predictable in terms of deliveries dates and cannot depend on weather o the extent sailing ships of the past were.

Many attempts have been made to add sails, of different kinds, as assistance to engine propelled vessels, like traditional sails, rigid sails, Flettner type sails or kite style sails. Those ways of propulsion still remain dependent on the wind direction and strength relative to the intended travel direction of the vessel and most of the time can only provide a slight, though welcome, offset of the GHG emissions if travel times have to remain predictable and reliable.

Document CH 714175 discloses a pedal boat where an air propeller is activated by pedaling.

Document U.S. Pat. No. 5,263,828 discloses a vessel comprising renewable energy means for collecting electricity and storing it into a battery, said energy is later used to supply a propeller.

SUMMARY OF INVENTION

The invention aims at solving the deficiencies of the prior art and, to this end, pertains to a vessel comprising both an aerodynamic spinning actuator and a hydrodynamic spinning actuator both being used concurrently to move the vessel.

This configuration offers several advantages over the prior art, and notably over prior art sailing ships, whatever the type of sail, and allows to use wind energy to propel the vessel with a better efficiency whatever the direction of the wind relative to the vessel direction of motion, and most of time in self sustainable conditions.

Actually, the aerodynamic spinning actuator is at least capable of at least harvesting wind energy to be converted in electrical energy by spinning and the hydrodynamic spinning actuator is at least capable of delivering a mechanical thrust force by being spun with the energy collected by the aerodynamic spinning actuator, the two actuators working concurrently at the same time.

More specifically the invention pertains to a vessel comprising a hull adapted to follow a vessel track at a ship speed in a motion direction, the hull being submitted to a hull drag force when moved in the motion direction, and a propulsion system comprising:

- a hydrodynamic spinning actuator, adapted to interact with water with a hydrodynamic torque and hydrodynamic power,
- an aerodynamic spinning actuator above the hull adapted to interact with an apparent wind with an aerodynamic torque and aerodynamic power,
- the aerodynamic spinning actuator and the hydrodynamic actuator are each connected to an aero-powerplant and a hydro-powerplant respectively,
- at least one of the aero-powerplant and the hydro-powerplant is adapted to transmit an outgoing spinning energy to one of the aerodynamic spinning actuator and the hydrodynamic spinning actuator,
- at least one of the hydro-powerplant and the aero-powerplant is adapted to covert an incoming spinning energy into an electrical energy,
- an onboard battery adapted to store a battery incoming electrical energy coming form the hydro-powerplant and the aero-powerplant and to supply a battery outgoing energy to the hydro-powerplant and the aero-powerplant,
- an electrical power line connecting the hydro-powerplant, the aero-powerplant and the onboard battery, and
- a control center configured to pilot the operating conditions of the propulsion system so that, in a sustainable operating condition where the ship speed is not 0, a sum of the incoming spinning energy and the battery outgoing energy minus the outgoing spinning energy is more or equal than 0.

A sustainable operating condition is an operating condition wherein the vessel generates at least the energy required for its propulsion and potentially more energy to be stored and used later on. The condition on energy addresses a condition in the long run, namely to significantly reduce the GHG emissions along a given route the vessel shall operate is such sustainable conditions along a significative part of the route.

Therefore, depending on the operating conditions and more particularly on the wind conditions, the control center operates the two actuators concurrently and balances the energy between a source which may be the aerodynamic spinning actuator or the hydrodynamic spinning actuator, an energy consumer providing a motion force to the vessel, which once again may be one or the other actuator, and an energy buffer, i.e. the onboard battery. This allows the vessel to move at a minimum speed over a working domain that covers almost, if not all, weather conditions that the vessel may encounter, including no wind and a strong upwind, thus making such a vessel reliable and predictable in terms of delivery times.

The invention is implemented according to the embodiment and variants disclosed hereafter that may be considered individually or in any operative combination.

According to an advantageous embodiment, the aerodynamic spinning actuator is adapted to generate a sailing thrust and wherein the control center is configured to drive a sustainable operating condition of the propulsion system when the ship speed is not 0, so that a vectorial sum of the components of the sailing thrust, the motion thrust and the hull drag, projected on the vessel track is more than 0.

This embodiment takes advantage of the sailing thrust provided by the aerodynamic actuator to widen the domain of working conditions.

The above mode of driving the operating conditions based on the forces provides a condition of sustainable motion on a shorter time scale depending on the vessel moving inertia, such conditions may alternate in time with less sustainable condition while the system is still compliant with the energy condition.

According to a specific embodiment, the aerodynamic spinning actuator is a power sail comprising 2 blades with a mechanism for a pitch control of the blades.

In a preferred embodiment, the power sail is set on an orientation support and comprises an orientation mechanism adapted to orient the power sail spinning axis.

Those characteristics allow to manage the amount of thrust of the power sail and energy harvesting, depending on the wind conditions.

Advantageously, the hydrodynamic spinning actuator comprises blades and a mechanism for controlling a pitch of the blades.

According to an embodiment the hydrodynamic spinning actuator is adapted to work in a propeller mode and in a hydrodynamic energy harvesting mode. This embodiment widens the possible operating conditions of self sustained propulsion.

Advantageously, the hydrodynamic spinning actuator is set on an orientation mechanism.

Advantageously, the vessel further comprises a plurality of sensors adapted to sense a incoming spinning power of the aerodynamic and the hydrodynamic spinning actuators, an outgoing spinning power transmitted to the hydrodynamic and to the aerodynamic spinning actuators, an outgoing and an incoming power supply of the onboard battery, the ship speed of the vessel, an apparent wind direction and an apparent wind velocity, and wherein the control center is configured to adjust the operating condition of the propulsion system so that, in a sustainable operating condition where the ship speed is more than 0, a sum of the incoming spinning power and the outgoing power supply from the battery minus the outgoing spinning power is more than 0.

Such a condition on the powers rules the instantaneous/short term behavior of the propulsion system, in combination with the mid term condition on the force and the long run condition on the energy.

In a preferred embodiment, the propulsion system is configured so that the piloting of the operating conditions comprises controlling at least one parameter among a spinning speed of the hydrodynamic and of the aerodynamic spinning actuator, the pitch of the blades of the aerodynamic and the hydrodynamic spinning actuators and an orientation angle of the aerodynamic and the hydrodynamic spinning actuators.

Advantageously, the propulsion system is configured so that the operating conditions cover 4 domains:
- a first domain wherein the hydrodynamic actuator and the power sail are operating in a propeller mode and are supplied in power by their respective powerplants,
- a second domain wherein the hydrodynamic actuator is operating in a propeller mode and is supplied in energy by the hydro-powerplant and the power sail is operating in a mode comprising supplying incoming spinning power to the aero-powerplant,
- a third domain where both the aerodynamic actuator and the hydrodynamic actuator are operating in a mode comprising supplying incoming spinning power to their respective powerplants and the vessel is moved by the sailing thrust on the aerodynamic actuator,
- a fourth domain wherein the aerodynamic actuator is operated as a propeller and the aero-powerplant is supplying outgoing spinning power to the power sail, the hydrodynamic actuator supplies incoming spinning energy to the hydro powerplant, and
- wherein the propulsion system is capable of operating in a self sustainable condition in at least 50% of the whole working domain in the second, third and fourth domain.

The invention also pertains to method for operating the vessel of the invention in a sustainable emission free operating condition, comprising steps of:
- i) acquiring a performance mapping of the vessel,
- ii) acquiring from the sensors a true wind direction and a true wind speed
- iii) setting a ship speed setting point
- iv) setting at least one parameter among the power sail orientation, the power sail spinning speed, the power sail blades pitch, the hydrodynamic spinning actuator spinning speed and blades pitch, according to a performance map so that the sustainable emission free operating condition is laying in a sustainable part of the second, the third and the fourth domain.

Advantageously, the method of the invention further comprises the steps of adjusting at least one parameter among a power supplied to the onboard battery by one of the hydro-power plant and the aero-power plant, and a power delivered by the onboard battery to one of the hydro-powerplant and the aero-powerplant.

According to an embodiment, if an operating condition laying in a sustainable part of the working domain cannot be found, modifying at least one among the ship speed setting point and a motion direction of the vessel and restart at step ii).

BRIEF DESCRIPTION OF THE DRAWINGS

The invention is implemented according to the preferred embodiments, in no way limiting and disclosed hereafter in reference to FIG. 1 to FIG. 7 in which.

DESCRIPTION OF EMBODIMENTS

Figure 1:
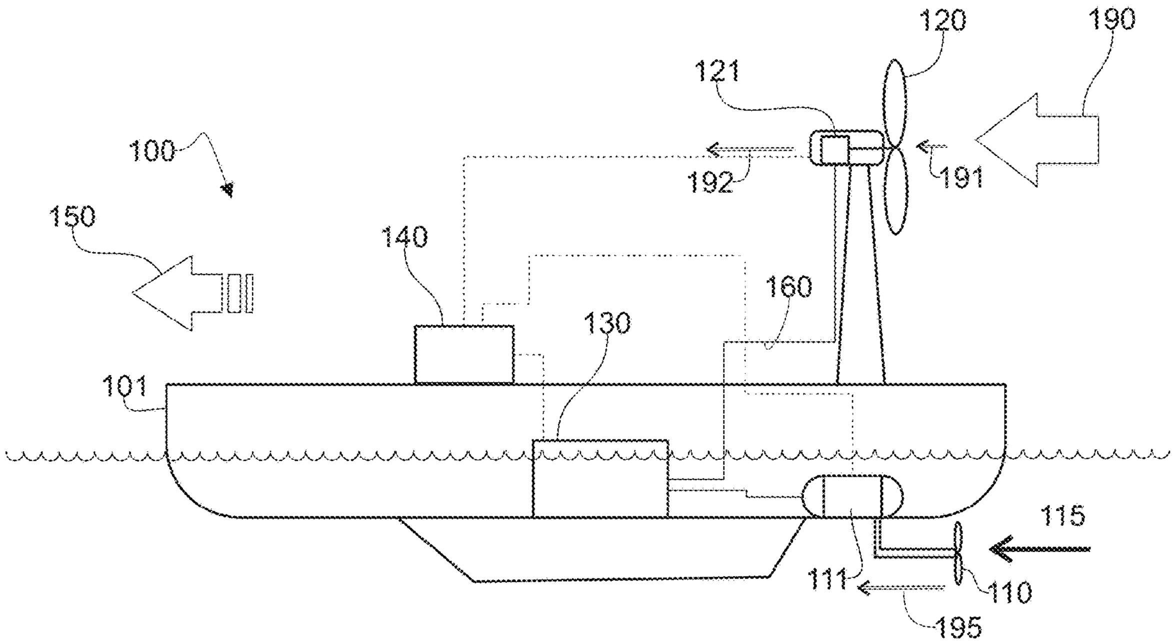
FIG. 1 is a diagrammatic profile view in cross section of a vessel according to the invention, subjected to downwind conditions.

In all the text a fluid dynamic spinning actuator is a device adapted to interact with a fluid, either water or air, and either to be spun by a fluid flow, thus potentially generating spinning energy which may be converted into electricity by a dedicated device such as an electrical generator, or, to generate a fluid flow when spun by an external source or energy, e.g, through an engine of any kind, the momentum created by this fluid flow generating a motion force.

The vessel of the invention comprises at least 2 fluid spinning actuators always working concurrently, each interacting with a different fluid, i.e. air and water, namely an aerodynamic spinning actuator and a hydrodynamic spinning actuator. The operating conditions of these two spinning actuators are driven such that their combined effects generate a motion force to propel the vessel at a determined cruising speed.

The two spinning actuators may be of any type known from the prior art.

As non limiting examples, the hydrodynamic spinning actuator may be a marine propeller, a hydro turbine, a pumpjet or an azimuth thruster. The aerodynamic spinning actuator may a horizontal axis 3 blades wind turbine (HAWT) commonly used in wind farms, a vertical axis Darrieus or Savonius type wind turbines, or may be of the aero-propeller type.

The person skilled in the art understands that all these kinds of fluid spinning actuators may not all be as effective and efficient, notably some of them may be more effective in the energy harvesting function other in the propulsion function or may have an average yield in both functions.

Also, their efficiency may change with the conditions, i.e. they may be more or less effective at high speed or low speed, and the compromise in the selection of the 2 fluid spinning actuators will also depend on the kind of vessel whether it's a cargo ship, a liner or a yacht as well as on the average cruising speed aimed at.

In a preferred embodiment the aerodynamic spinning actuator is a power sail. Such a power sail may operate like a sail, a wind turbine, an air propeller or combinations thereof.

It comprises a rotor with at least two blades and a pitch control mechanism. The rotor is set on a platform allowing its orientation notably to optimize its operating condition with regard to a wind direction.

According to the invention, the vessel may be propelled full time by the propulsion system as defined and does not require any other propulsion system such as sails or engine of any kind.

The latter does not preclude, for applications that are not part of the invention, to use each of the spinning actuators alone or in sequence but not concurrently, either to harvest energy or to propel the vessel or, for instance, for harvesting energy with one of the actuators, energy that will later be used to propel the vessel with the other actuator, like some small sailing boats having a small wind turbine with a battery, harvesting energy when the boat is sailing and using this energy to propel the boat for port maneuvers.

The latter does not preclude either, in embodiments that are not part of the invention, the vessel of having one or more alternative propulsion systems that may supplement the propulsion system as disclosed in the invention.

In the simplified situations depicted hereinafter in reference to [FIG. 1] and [FIG. 2] the aerodynamic spinning actuator is assumed to be a power sail facing the wind.

[FIG. 1] according to a diagrammatic embodiment a vessel (100) of the invention comprises a hull (101) partly immersed in the water. The hull (101) generates a hull drag (105) opposing the motion of the vessel (150), the intensity of said drag depending on the vessel speed of motion.

The vessel further comprises a hydrodynamic spinning actuator (110) immersed in the water, like a marine propeller, which is adapted to interact with the water either by creating a water flow and associated momentum, when the hydrodynamic spinning actuator is spun, or by spinning when subjected to a water flow. In both cases the water exerts a torque (195) on the hydrodynamic actuator which, when multiplied by the spinning speed defines an actuator hydrodynamic power $P_h$. Assuming a yield of 1, $P_h$ may also be defined as the product of thrust/drag force (115) multiplied by the speed of motion of the vessel.

The hydrodynamic spinning actuator is mechanically linked to a hydro-powerplant. The hydro-powerplant may comprise any and all of an electric motor adapted to spin the hydrodynamic actuator, a generator adapted to generate electricity when spun by the hydrodynamic actuator operating in a water turbine mode and in an embodiment that is not part the invention an auxiliary engine adapted to drive the hydrodynamic actuator.

$P_h$ may be a motion power, e.g. when the hydrodynamic spinning actuator is spun by the hydro-powerplant (111) or can be a resistive power when the hydrodynamic actuator is used as a water turbine, for instance to generate electricity, The vessel further comprises an aerodynamic spinning actuator like a power sail (120), A The aerodynamic actuator is mechanically linked to an aero-powerplant (121) which, like the hydro-powerplant, may comprise an electric generator adapted to generate electricity when driven by the power sail operating in a wind turbine mode, an electric motor adapted to spin the power sail rotor when the power sail is operating in an air propeller mode, and in an embodiment that is nir part of the invention may comprise an auxiliary engine adapted to spin the aerodynamic actuator.

[FIG. 1], the wind turbine is subjected to a wind torque (192) which when multiplied by the spinning speed provides an aerodynamic spinning power $P_a$.

As with the hydrodynamic spinning actuator and $P_h$, $P_a$ may be an incoming power, when the power sail is operating in a wind turbine mode and drives the aero-powerplant to generate electricity, or can be an outgoing power when the power sail is driven by the aero-powerplant and operates like an aero propeller.

The electricity generated by the aero-powerplant (121) when the power sail (120) operating in a wind turbine mode is spun by the wind is conveyed by an electrical power line (160) to an onboard battery (130), or any other type of energy storing device, for storage.

The electrical powerline (160) further connects the onboard battery (130) to the hydro-powerplant (111).

A control center (140) operates the system according to conditions assessed though a plurality of sensors (not shown on this figure).

According to an exemplary condition, the vessel is subjected to downwind (190) that is parallel to the cruising direction (150) of the vessel.

The wind is blowing at a given true wind speed the power sail (120) is subjected to an air flow at an apparent wind speed, which is the combination of the wind speed and the vessel motion speed. In the exemplary condition of [FIG. 1] where both the wind speed and the ship speed are colinear, the apparent wind speed is simply the scalar value of the wind speed minus the vessel cruising speed.

Thus, if the vessel is moving at 12 knots, and the wind is blowing at a true wind speed of 20 knots, in the conditions of [FIG. 1], the apparent wind speed is 8 knots.

When subjected to a wind at an apparent wind speed $V_a$ the wind turbine is subjected to a wind torque (192) and spins at a given spinning speed depending on the characteristics of the blades, generating a mechanical spinning power, the corresponding energy is converted in electrical energy by the aero-powerplant (121) and conveyed to the onboard battery (130). The spinning power $P_a$ of the wind turbine is proportional to $V_a^3$ (the third power of the apparent wind speed)

In such a downwind condition, the power sail is also subjected to a wind thrust force (191) that is proportional to the area swept by the blades of the power sail during a rotation and to $V_a^2$ (the square of the apparent wind speed). In other words, the power sail is also adapted to operate like a sail.

In the downwind condition of [FIG. 1] this wind thrust force (191) $T_A$ concurs to the propulsion of the vessel with a power $P_T$ equal to the product of the thrust force by the ship speed.

The drag force (105) R of the hull (101) at the ship speed of the vessel generates a resistive power $P_R$ opposing the motion power and equal to the product of the hull drag force by vessel ship speed.

According to a first scenario, the vessel may be propelled only by the wind thrust (191) on the power sail According to variants the power $P_a$ may be directed to the battery (130) for storage, or, the power sail may be set, e.g. by setting the pitch of the blades, in an auto rotation situation favoring the thrust with very little spinning power, in such a case $P_a$ is close to 0 and neglected.

In such a scenario, the hydrodynamic actuator does not need to generate a thrust. The hydrodynamic actuator, may be set to spin the hydro-powerplant and to generate electrical energy and will generate a drag force $T_H$ and a resistive drag power $P_d$ equal to the product of $T_H$ by the vessel ship speed.

In such a first scenario the condition for the ship to move sustainably at the targeted ship speed may be expressed in terms of power by:

$$P_T + P_h \geq P_d + P_R \quad \text{[Math. 2]}$$

And in terms of forces (scalar):

$$T_A \geq R + T_H \quad \text{[Math. 2]}$$

In another scenario, still in downwind conditions, the wind thrust is not high enough to overcome the hull drag at the targeted ship speed of vessel.

In such a scenario the hydrodynamic actuator (110) may be spun by the hydro-powerplant (111) to supplement the power sail thrust. The hydro-powerplant (111) may be supplied in energy through the electrical powerline (160) either directly by the aero-powerplant (121) or though the onboard battery (130) acting as an energy buffer which, in this scenario, is itself supplied by the aero-powerplant.

In this hypothesis the hydrodynamic actuator generates a water thrust (115), in the direction of the vessel motion, thus supplying a positive motion power $P_h$.

In such a second scenario, the condition for the vessel to move sustainably at the given ship speed is given by:

$$\begin{cases} P_T + P_h \geq P_R \\ P_a \geq P_h \end{cases} \quad \text{[Math. 3]}$$

And in terms of forces:

$$T_A + T_H \geq R \quad \text{[Math. 4]}$$

The person skilled in the art understands that the forces relationships in more complex situation are to be expressed in vectorial sums.

Figure 2:
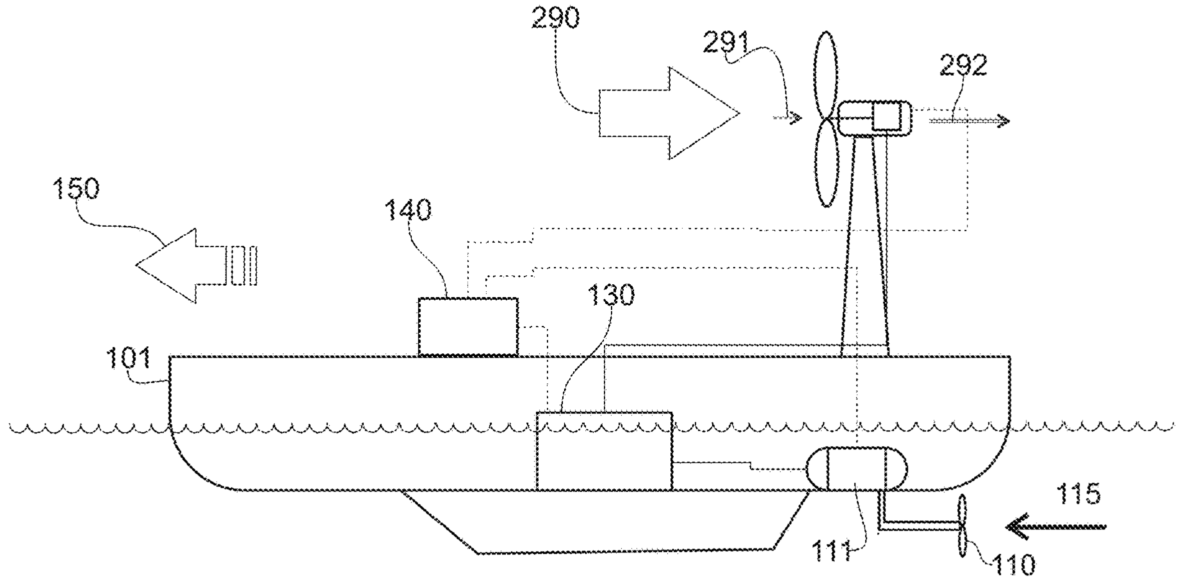
FIG. 2 is the same view as FIG. 1 where the vessel is subjected to upwind conditions.

[FIG. 2] in another simplified scenario the vessel (100) is subjected to upwind conditions, wherein the wind direction (290) is parallel but opposite the motion direction (150) of the vessel.

The apparent wind speed is therefore the addition of the true wind velocity and the vessel ship speed, i.e. if the vessel is moving at 12 knots and the true wind velocity is 20 knots, the apparent wind speed is 32 knots.

In these exemplary conditions the wind spins the power sail (120), the spinning power is converted to an electrical power by the aero-powerplant that is conveyed by the powerline (160) to the onboard battery (130). Compared to the case of [FIG. 1], though in both cases the true wind velocity is 20 knots and the vessel ship speed is 12 knots, the spinning wind power $P_a$ which is proportional to $v_a^3$ is potentially 64 times higher in the case of [FIG. 2] compared to the case of [FIG. 1].

The power sail is subjected to a wind thrust (291) that, according to this situation is actually a drag. As a rough estimates, because the thrust is proportional to $V_a^2$, this drag force is 16 times higher and opposite compared to [FIG. 1] with the above conditions.

Therefore, additional thrust has to be provided by the hydrodynamic actuator, spun by the hydro-powerplant (111) which is for instance supplied in energy by the onboard battery. The power sail may also be spun by the aero-powerplant in order to generate a positive thrust and to compensate, at least partially, the drag.

Therefore, the conditions for the vessel to move sustainably are:

$$\begin{cases} P_h \geq P_R + P_T \\ P_a \geq P_h \end{cases} \quad \text{[Math. 5]}$$

And in forces:

$$T_H \geq R + T_A \quad \text{[Math. 6]}$$

If the second part of the power equation is not met, the battery, acting as a buffer may supply an additional energy at a rate $P_b$. Such energy may have been stored previously, for instance, when the vessel was cruising in the conditions of [FIG. 1].

The power condition becomes;

$$\begin{cases} P_h \geq P_R + P_T \\ P_a + P_b \geq P_h \end{cases} \quad \text{[Math. 7]}$$

While the force condition of [Math.6] remains the same.

The above is sustainable for the time the onboard battery can supply the extra power. Alternatively, the targeted ship speed of the vessel may also be reduced to reach another working point.

Figure 3A:
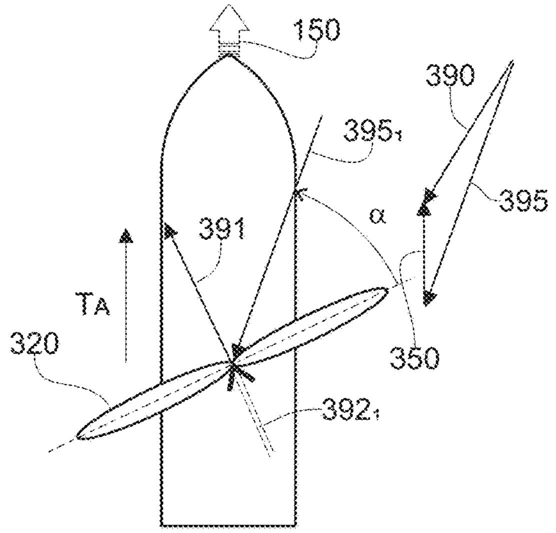
FIG. 3A is a diagrammatic view in elevation of a vessel of the invention showing the an exemplary condition where the power sail is operating in a propeller mode.
Figure 3B:
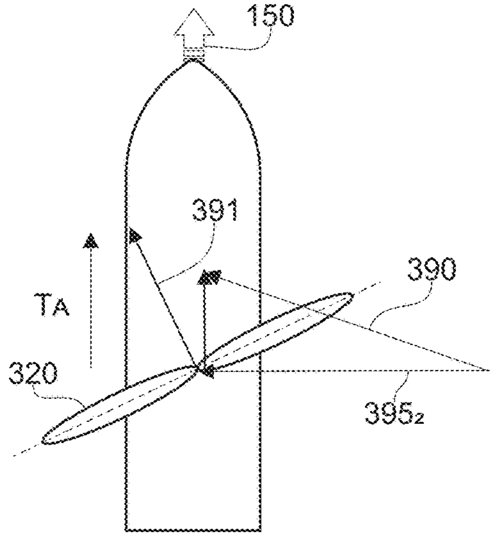
FIG. 3B is a diagrammatic view in elevation of a vessel of the invention showing an exemplary condition where the power sail is operating in a sail mode.
Figure 3C:
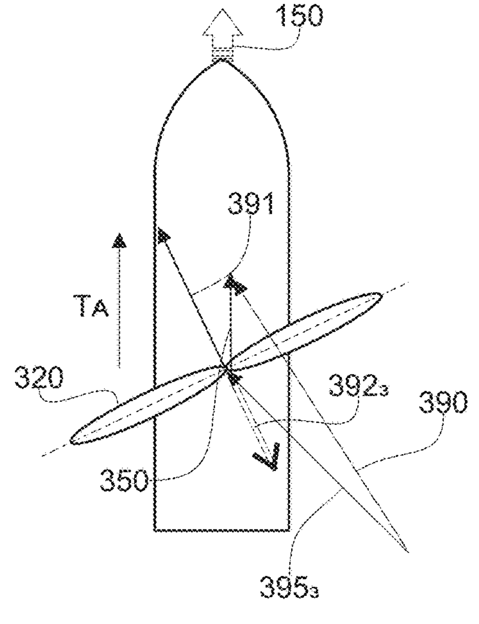
FIG. 3C is a diagrammatic view in elevation of a vessel of the invention showing an exemplary condition where the power sail is operating in a wind turbine and sail mode.

[FIG. 3A] to [FIG. 3C] are depicted the possible working conditions of a power sail (320).

In all of these figures the power sail is oriented by and angle α between a mid plane of rotation of the blades and the direction of the apparent wind vector (395). The apparent wind vector (395) is the vector sum of the true wind vector (390) and the vessel speed vector (350).

[FIG. 3A] the projection of the apparente wind vector (395$_1$) on the vessel track (150) is opposite the ship speed (350). In such a condition, the power sail may be spun by the aero-power plant and subjected to an outgoing mechanical torque (392$_1$) an power so as to generate a positive motion power $P_A$ and a motion force (391) that projects as a thrust force $T_A$ on the vessel track (150).

[FIG. 3B] the apparent wind vector (395$_2$) is perpendicular to the vessel track (150) and the ship speed (350). In such a condition the power-sail may be in an autogiro mode, free spinning in auto-rotation and not generating spinning power. In fact, the power sail acts as a sail and generates a moon force (391) that projects as a thrust force $T_A$ on the vessel track.

[FIG. 3C] the projection of the apparent wind vector (395$_3$) on the vessel track is parallel and in the same direction as the ship speed (350). In such a condition the power sail operates both as a sail, generating a motion force (391) that projects as a thrust force $T_A$ on the vessel track, and incoming mechanical torque (392$_3$) and spinning power $P_A$, that, as a convention, is counted negative, and is converted into an electrical power by the aero-powerplant.

Figure 4:
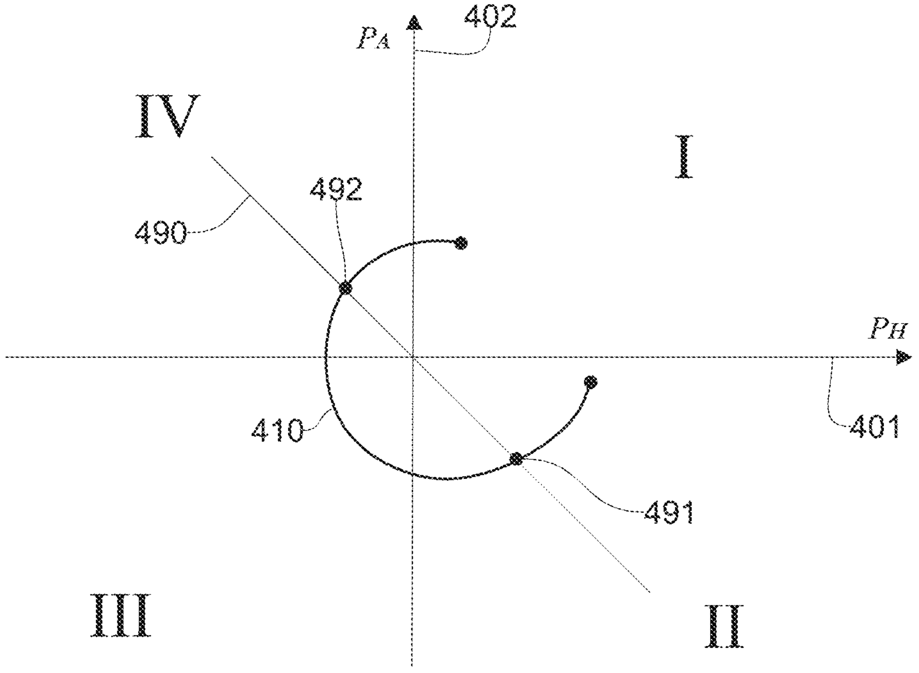
FIG. 4 is a diagram showing the various operating condition and the circulation of power between the two actuators of a vessel of the invention.

[FIG. 4], as a summary, shows the different operating conditions of the vessel and the corresponding energy/power flows between the two actuators.

In a generalized case, both of the spinning actuators are assumed to be capable of providing a motion power when supplied in energy or to harvest energy when spun by a fluid current of the fluid they are interacting with.

By controlling the angle a, the pitch of the blades of the hydrodynamic actuator and of the power sail, as well as the spinning speeds of the actuators through the driving or braking mechanical power/torque the actuators are submitted by their respective power plant, the conditions may be varied continuously to any condition between the exemplary conditions depicted in [FIG. 3A] to [FIG. 3C].

$P_A$ (402) and $P_H$ (401) represent the total powers supplied or retrieved respectively by the aerodynamic spinning actuator and the hydrodynamic spinning actuator including associated thrust and drag effect.

By convention $P_A$ and $P_H$ are counted positive when they provide motion energy to the vessel and negative when they provide electrical energy that may be used either directly by the other actuator or stored in the onboard battery.

A specific set of operating conditions for a given vessel, moving at a given ship speed is given by a curve (410) in this diagram. The diagram may be split in four working domains corresponding to the four quadrants (I.II.III. IV) of the diagram.

In a first domain (quadrant I) both $P_A$ and $P_H$ are positive meaning that the vessel requires both the hydrodynamic actuator and the aerodynamic actuator to be supplied in energy by their respective powerplants. In a sustainable moving condition this supplemental power may be supplied by the onboard battery provided the corresponding energy has been stored before, as a for instance the power sail may be used to harvest wind energy when the vessel is at anchor to charge the onboard battery and enabling the vessel to operate transitorily in the conditions of the first domain. As a consequence, for moving the vessel sustainably at zero emissions, operating conditions in domain I have to be avoided or kept to a minimum, so as to be covered by the onboard battery energy.

The latter does not preclude in an operation mode that is not part of the invention to use an auxiliary power engine to move the vessel in an operating condition of the first domain, the propulsion system of the invention being used to reduce the emission by providing part of the required extra power though the onboard battery that has been charged with renewable energy provided by one or the other powerplant while the system was operating in other operating conditions.

In a second domain (quadrant II) the hydrodynamic actuator is operating as a propeller and is spun by the hydro-powerplant, while electric energy is generated by the aero-powerplant by converting the incoming spinning energy of the power sail operating in a wind turbine mode. For a self sustainable motion, the second domain is more favorable since at least part of required supplemental energy is generated by the power sail.

A line of power balance (490) (at 45°) splits the second domain in two parts. For any working point (491) on this line of power balance, the energy generated by the power sail compensates the energy consumed by the hydro-power plant.

In the part of the second domain on the left of the line of power balance I (490) the power sail provide more incoming spinning power converted to electrical power by the aero-powerplant, than required by the hydro-powerplant to spin the hydrodynamic actuator for propelling the vessel, therefore this extra energy may be stored in the onboard battery, In a third domain (quadrant III) both actuators are generating incoming spinning power converted I electric energy by their respective powerplants, meaning that the vessel is propelled by the thrust on the power sail.

The fourth domain (quadrant IV) is a mirror symmetry of the second domain: the vessel is propelled by the power sail operating as a propeller while the hydrodynamic actuator provides at least part of the required energy. On the point of equilibrium the incoming spinning power input by the hydrodynamic actuator in the hydro-powerplant exactly balance the outgoing mechanical power provided by the aero-powerplant to spin the power sail.

For a given vessel at a given ship speed having a corresponding curve (410) in the diagram of [FIG. 4], for the vessel to move sustainably at zero emission, the control center will drive the control parameters in order to keep the operating condition on the left side of the line of power balance (490) most of the time and to store enough energy in the onboard battery to compensate the power demand when the vessel is running in operating conditions on the right side of the line of power balance (490).

As it can be seen on [FIG. 4] sustainable zero emission conditions account for at least 50% of the operating domain of the propulsion system.

Figure 5:
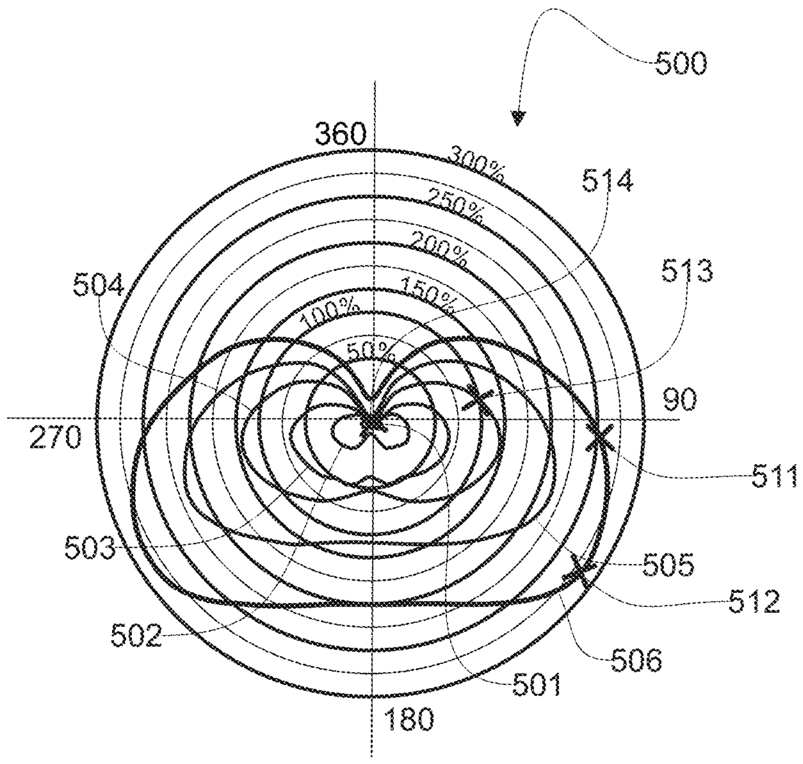
FIG. 5 shows the working condition of a vessel of the invention according to the ship speed and true wind direction.

[FIG. 5] shows an excerpt of a performance mapping of a given vessel at a given ship speed.

The concentric circles are showing the percentage of the motion power of the vessel generated by the hydro-powerplant and the aero-powerplant driven by their respective actuators. The cardioid curves represent the working domain for different combinations of ship speed and true wind speed, in this exemplary embodiments 12 knots-30 knots (506), 12 knots-25 knots (505), 12 knots-20 knots (504), 12 knots-15 knots (503), 12 knots-10 knots (502) and 12 knots-5 knots (501) and according to the apparent wind direction relative the vessel track, i.e. 360° is a pure upwind and 180° is a pure downwind.

For driving the vessel, the control center comprises in memory means the full performance mapping of the vessel. The full performance mapping is, for example, obtained by prior numerical simulation or onboard real time simulation.

Alternatively, the simulations for determining the optimized operating conditions may be performed remotely through a communication or a satellite network based on data sent by the vessel to a remote calculator, the condition being sent back to the vessel through the same network in terms of set points for the driving parameters.

By acquiring and analyzing the signals issued by the sensors, the control center may set an operating condition (511, 512, 513, 514) on the performance mapping that correspond to a sustainable working point meaning this working condition is located on the left side of the line of power balance of [FIG. 4].

To this end the control center may look to adjust at least one parameter among the power sail orientation, the power sail spinning speed, the power sail blades pitch, the hydrodynamic spinning actuator spinning speed and blades pitch.

If an appropriate tuning cannot be found the control center may change the cruising conditions, i.e. the cruising speed and/or the cruising direction.

Once a condition is found, the corresponding parameters are applied to the vessel operation.

It shall be understood that first of all, running the vessel in sustainable zero emission conditions is just a way and not a unique way of driving the vessel, in particular when the vessel comprises an auxiliary engine. The conditions are always a compromise as a trade off between different constraints, like shipping speed, schedule, fuel consumption and GHG emissions.

Second, that the operating conditions may be changed dynamically and may jump back an forth from one working domain to another in a matter of minutes, such a flexibility being provided specifically by the dual fluid nature of the propulsion system.

Figure 6:
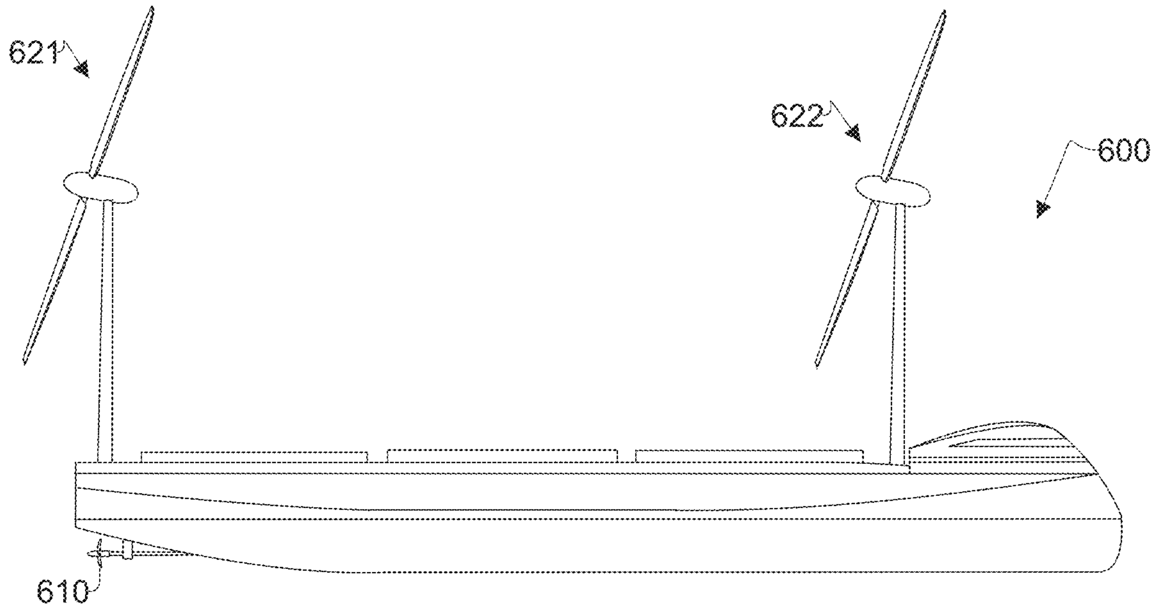
FIG. 6 is a profile view of an exemplary embodiment of a vessel of the invention.

Although non limiting, the invention is particularly dedicated to medium and large vessels with a length comprised between 80 m and 250 m, and cruising at slow to moderate speeds, i.e. from 8 knots to 14 knots, such as cargo ships, bulk carriers, oil and chemical tankers and gas tankers this list not being limitative The following examples are given for a vessel like a bulk carrier (600) shown in [FIG. 6] having the following characteristics:

TABLE 1

| | |
|---|---|
| Length | 138 m |
| Beam | 18 m |
| Draught | 6.5 m |
| Service Speed | 12 knots |
| Displacement | 11,570 t |
| Deadweight | 8,210 t |
| Gross Tonnage | 7,548 t |
| Main Power | 2,700 KW |
| Auxiliary power | 300 KW |

The aerodynamic actuator is a couple of wind turbines (621, 622) having the following characteristics:

TABLE 2

| | |
|---|---|
| Number of rotors | 2 |
| Rotor diameter | 60 m |
| Tower height | 43.5 m |
| Nb of blades per rotor | 2 |
| Total power | 3,000 KW |

The hydrodynamic actuator is a marine propeller (610) with a diameter of 4 m and 4 blades. The marine propeller is spun by an electric engine of 2,700 KW.

This non limiting exemplary, vessel moves at a speed of 12 knots, allowing an Atlantic Ocean crossing predictably in 10 to 20 days depending on the route.

All examples are given for a ship speed of 12 knots. At this speed the hull generates a drag of 153 KN intensity.

EXAMPLES

The hull is assumed to oppose a drag of intensity R of 153 KN at 12 knots therefore the resistive power $P_R$ is R multiplied by the speed of motion, which according to the characteristics of the ship is about 0.95 MW.

Although not shown in the tables hereunder for readability, the examples are taking into account electrical losses and mechanical yields of the different components of the powertrain.

Example 1

The operating conditions are represented by a working point (511) on the last cardioid curve (506) of [FIG. 5]. The wind velocity is 30 knots and the wind is oriented perpendicular to the vessel cruising direction. As shown in [FIG. 3B], in such a condition the power sail operates like a sail, spinning but not generating electric power, i.e. the condition is in the third quadrant of the working domain of [FIG. 4]. The results are given in [Table.3].

TABLE 3

| | |
|---|---|
| Aerodynamic thrust | 165 KN |
| Aerodynamic power | −2.2 W |
| Hydrodynamic thrust | 0 |
| Hydrodynamic power | −0.9 MW |
| Battery storage power | 2.0 MW |

The thrust generated by the power sail is higher than the drag of the hull, and allows to further harvest energy from the hydrodynamic actuator.

Example 2

In a second condition (512) of the performance map shown in [FIG. 5] the wind velocity is 30 knots and the wind directions is 125° relatives the cruising direction. The power sail operates both as a wind turbine and a sail, as shown in [FIG. 3C] and the conditions are located in the third domain of [FIG. 4].

Results are given in [Table.4].

TABLE 4

| | |
|---|---|
| Aerodynamic thrust | 232 KN |
| Aerodynamic power | −2.6 MW |
| Hydrodynamic thrust | −67 KN (drag) |
| Hydrodynamic power | −1.4 MW |
| Battery storage power | 2.6 MW |

Example 3

Compared to the previous examples, the third exemplary condition (513) on the performance map shown in [FIG. 5] correspond to a lower wind velocity of 20 knots and a wind direction of 40° relative the cruising direction, corresponding for the power sail to the conditions of [FIG. 3A] and to the second domain of [FIG. 4] on the right side of the line of power balance, meaning that the battery need to supplement the system by delivering energy to the hydro-powerplant.

Results are given in [Table.5].

TABLE 5

| | |
|---|---|
| Aerodynamic thrust | −8 KN (drag) |
| Aerodynamic power | −1 MW |
| Hydrodynamic thrust | 172 KN |
| Hydrodynamic power | 1.1 MW |
| Battery storage power | −0.7 MW (Power draught) |

Example 5

This fourth exemplary condition (514) of the performance map shown in [FIG. 5], is an extreme case corresponding to a unfavorable light wind condition with a wind velocity of 5 knots and a wind direction of 100° corresponding to [FIG. 3A] and to the first domain of [FIG. 4]. Both the power sail and the hydrodynamic actuator are operated as propellers and the required power is draught from the battery.

Results are given in [Table.6]

TABLE 6

| | |
|---|---|
| Aerodynamic thrust | 27 KN |
| Aerodynamic power | 0.1 MW |
| Hydrodynamic thrust | 127 KN |
| Hydrodynamic power | 0.8 MW |
| Battery storage power | −1.2 MW (Power draught) |

Although the battery needs to supplement the propulsion power, the system still allows to save some energy compared to a conventional vessel.

The description of the various embodiments and above examples show that the invention reaches the objective of providing a vessel that can be self sustainably propelled in most operating conditions by combining concurrently a hydrodynamic spinning actuator and an aerodynamic spinning actuator.

In the above examples the vessel behaves mostly like a sailing ship and the additional spinning power provided by actuator is used to compensate the less favorable sailing conditions by a thrust powered by the energy concurrently harvested by the actuators and stored in the battery if needed. The hull is therefore preferably optimized for sailing.

Figure 7:
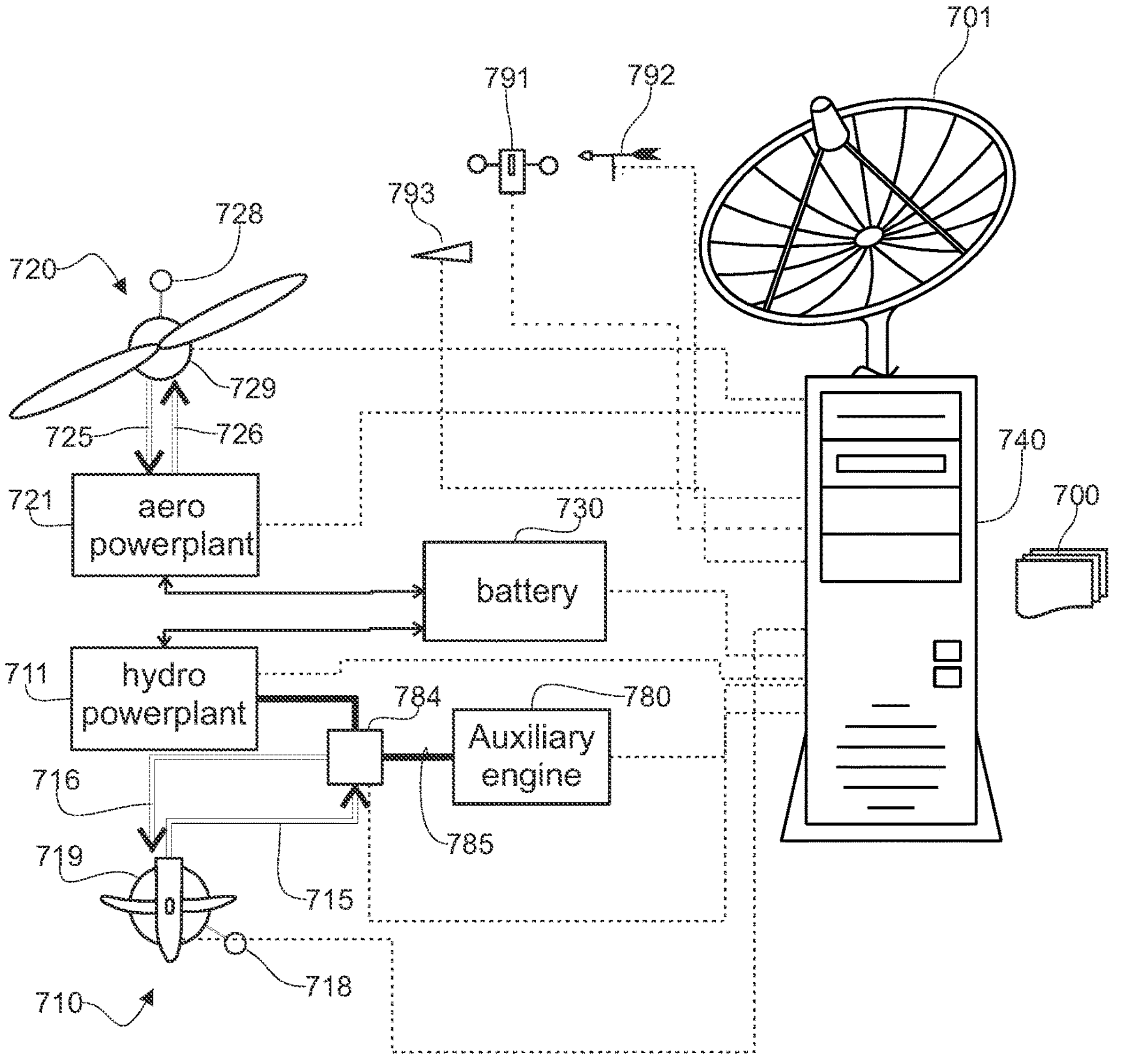
FIG. 7 is flow diagram showing the power and information flow among the components of the propulsion system.

[FIG. 7] shows diagrammatically the flow of power and controls among the components of the system.

The two major components are the aero-powerplant (721) and the hydro-powerplant (711). Both powerplants are capable of exchanging incoming mechanical power (715, 725) in the form of incoming spinning power and outgoing mechanical power (716, 726) in the form of outgoing spinning power with respectively an aerodynamic actuator (720), preferably a power sail, and a hydrodynamic actuator (710).

In a nutshell, a powerplant (711, 721) comprises an electrical generator and an electric motor, both mechanically connected, either directly or indirectly.

As an example of an indirect connection, here shown for the hydrodynamic actuator, the vessel comprises an auxiliary engine (780) in the form of a diesel engine or a gas turbine.

The engine is connected, via a shaft (785), to the hydro-powerplant and the powertrain comprises a clutch and gear shift mechanism (784) that enable to clutch the motor of the hydro-powerplant to supplement or to substitute the auxiliary engine (785) to supply outgoing mechanical power (716) to the hydrodynamic actuator (710), or to derive part of all of the mechanical incoming power (715) to the generator of the hydro-powerplant (711).

The hydro-powerplant and the aero-powerplant may supply or draw electric power from the battery (730).

In this exemplary embodiment both the hydrodynamic actuator (710) and the aerodynamic actuator are set on an a remotely controllable orientation support (719, 729). The orientation support enables an orientation in a single plane, e.g. like a pivoting platform, or in space like a ball joint.

The two actuators further comprise a pitch control mechanism (718, 728), said pitch control mechanism may be static or dynamic and/or cyclic like for the blade of a helicopter propeller.

The person skilled in the art understands that sensors (not shown) delivering a signal indicative of the pitch and the orientation of each actuators are associated with each actuator.

In the same way each major component of the system comprises sensors delivering information about its instantaneous state.

The system further comprises other sensors, at least an apparent wind speed sensor (791), an apparent wind direction sensor (792) and a ship speed sensor (793).

The control center (740) comprises memory means and calculation means and comprises a complete performance mapping (700) of the vessel potential operating conditions. According to this performance mapping, the information retrieved from the sensors and updated information obtained through radio-communication means (701) such as the weather forecast, the control center optimized the instant operation, the mid term operation and the long term operation of the various components according to objective criteria like energy savings, emission savings, delivery time, costs or any combination thereof.

The calculation may either be performed onboard or remotely, where the data are send via the radio communication means to a remote calculation center which sends back the set points for the various controlled parameters.

The invention claimed is:

1. A method for controlling an operation condition of a vessel, in a sustainable emission free condition, the vessel generating a resisting drag power when moving, comprising:

a hydrodynamic spinning actuator comprising blades, configured to work in a propeller mode and in a water turbine mode, a pitch control mechanism of the hydrodynamic spinning actuator blades and an orientation mechanism configured to orient a spinning axis of the hydrodynamic spinning actuator blades, a hydro-powerplant configured to convert an incoming hydrodynamic power of the hydrodynamic spinning actuator operating in the water turbine mode into electricity and to supply an outgoing hydrodynamic power to the hydrodynamic spinning actuator operating in the propeller mode, a power sail comprising 2 blades spinning around a power sail spinning axis and configured to operate in a sail mode, in a wind turbine mode and in an air propeller mode, an aero-powerplant configured to convert an aerodynamic incoming power from the power sail operating in the wind turbine mode into electricity and to supply an outgoing aerodynamic power to the power sail operating in the air propeller mode, a pitch control mechanism of the power sail blades and an orientation mechanism configured to orient the power sail spinning axis, an onboard battery configured to supply and to receive a battery power, an electrical power line connecting the hydro-powerplant, the aero-powerplant and the onboard battery, a plurality of sensors comprising, a vessel speed sensor, an apparent wind direction sensor and an apparent wind velocity sensor;

a control center, wherein the operation condition comprises 4 domains:

a first domain wherein the hydrodynamic spinning actuator and the power sail are operated in the propeller mode, supplied by the onboard battery, a second domain wherein the hydrodynamic spinning actuator is operated in the propeller mode and the power sail is operated in the wind turbine mode, a third domain wherein the power sail is operated concurrently in the sail mode and in the wind turbine mode and the hydrodynamic spinning actuator is operated in the water turbine mode, a fourth domain wherein the power sail is operated in the propeller mode, and the hydrodynamic actuator is operated in the water turbine mode, wherein for each domain a sum of the aerodynamic incoming power and the hydrodynamic incoming power minus the drag resisting power, the outgoing aerodynamic power and the outgoing hydrodynamic power equals the battery power, the method comprising steps of:

i) acquiring a performance mapping of the vessel, ii) acquiring, from the sensors, a true wind direction and a true wind speed iii) setting a ship speed setting point, and iv) setting at least one parameter among a power sail orientation, a power sail spinning speed, a power sail blades pitch, a hydrodynamic spinning actuator spinning speed and blades pitch and a hydrodynamic spinning actuator orientation according to the performance map so that the operation condition is laying in a sustainable part of the second, the third and the fourth domain, wherein the onboard battery receives a battery power equal or more than 0.

2. The method of claim 1, comprising a step of:

if an operating condition laying in a sustainable part of the working domain cannot be found, modifying at least one among the ship speed setting point and a motion direction of the vessel and restart at step ii).

3. The method of claim 1, further comprising a step of adjusting a parameter among the battery power received by the onboard battery by one of the hydro-power plant and the aero-power plant, and the battery power supplied by the onboard battery to one of the hydro-powerplant and the aero-powerplant.

4. The method of claim 3, wherein the vessel comprises an auxiliary engine and a clutch mechanism configured to substitute the auxiliary engine to the hydro-powerplant and to supplement the hydro-powerplant in supplying outgoing hydrodynamic power.

* * * * *